United States Patent
Hio et al.

(10) Patent No.: US 9,283,509 B2
(45) Date of Patent: Mar. 15, 2016

(54) FILTER ELEMENT

(71) Applicant: ROKI CO., LTD., Hamamatsu-shi, Shizuoka (JP)

(72) Inventors: Yosuke Hio, Hamamatsu (JP); Taisuke Sato, Hamamatsu (JP)

(73) Assignee: ROKI CO., LTD., Hamamatsu-shi (JP)

( * ) Notice: Subject to any disclaimer, the term of this patent is extended or adjusted under 35 U.S.C. 154(b) by 37 days.

(21) Appl. No.: 14/168,582

(22) Filed: Jan. 30, 2014

(65) Prior Publication Data
US 2014/0230388 A1 Aug. 21, 2014

(30) Foreign Application Priority Data
Feb. 21, 2013 (JP) ................................. 2013-032277

(51) Int. Cl.
| B01D 46/52 | (2006.01) |
| B01D 29/07 | (2006.01) |
| B01D 46/10 | (2006.01) |

(52) U.S. Cl.
CPC .............. B01D 46/523 (2013.01); B01D 29/07 (2013.01); B01D 46/10 (2013.01); *B01D 2201/127* (2013.01)

(58) Field of Classification Search
CPC .... B01D 46/10; B01D 46/521; B01D 46/523; B01D 2201/127
See application file for complete search history.

(56) References Cited

U.S. PATENT DOCUMENTS

| 4,547,950 A * | 10/1985 | Thompson ....................... 29/445 |
| 5,273,563 A * | 12/1993 | Pasch et al. ..................... 55/493 |
| 5,273,564 A * | 12/1993 | Hill ................................. 55/493 |
| 5,743,927 A * | 4/1998 | Osendorf ......................... 55/497 |
| 5,840,094 A * | 11/1998 | Osendorf et al. ................ 65/27 |
| 5,989,303 A * | 11/1999 | Hodge ............................ 55/486 |
| 2005/0229558 A1* | 10/2005 | Stelzer et al. ................ 55/385.3 |
| 2006/0169632 A1 | 8/2006 | Suzuki et al. |
| 2008/0060987 A1* | 3/2008 | Goto ............................ 210/231 |
| 2009/0183633 A1 | 7/2009 | Schiller et al. |
| 2010/0107576 A1* | 5/2010 | Belyew .......................... 55/306 |
| 2010/0236204 A1* | 9/2010 | Bouhanna et al. .............. 55/494 |
| 2013/0008845 A1 | 1/2013 | Saito et al. |
| 2014/0109768 A1* | 4/2014 | Bowman .......................... 96/76 |

FOREIGN PATENT DOCUMENTS

JP 2002-273116 A 9/2002

OTHER PUBLICATIONS

European Search Report dated Jun. 16, 2014 issued in Application No. 14151902.5-1356.

* cited by examiner

*Primary Examiner* — Robert Clemente
(74) *Attorney, Agent, or Firm* — Sughrue Mion, PLLC

(57) ABSTRACT

A filter element includes a filter member provided with a plurality of pleat portions and a frame body holding an outer peripheral portion of the filter member. The frame body is provided with a comb-shaped portion having a comb-tooth portion which is inserted into adjacent pleat portions and contacts to a surface of the filter member, and the comb-shaped member is formed by an insert-molding process.

4 Claims, 2 Drawing Sheets

FILTER ELEMENT

CROSS REFERENCE TO RELATED APPLICATIONS

This application claims priority from on Japanese Patent Application No. 2013-032277 filed Feb. 21, 2013, the contents of all of which are incorporated herein by reference in their entirety.

BACKGROUND OF THE INVENTION

1. Field of The Invention

The present invention relates to a filter element, and more particularly, to a filter element mounted to an air cleaner, an oil strainer or like applicable to an internal combustion engine.

2. Related Art

There is known, in a conventional technology, a filter element provided with a filter member that is formed by folding a non-woven fabric (unwoven cloth) or filter paper along a width direction thereof to provide pleated-shape (which may be called hereinafter pleated filter member or merely filter member) and a holder frame that holds or supports an outer edge portion of the pleated filter member.

As a prior art patent document, there is provided, for example, Japanese Patent Laid-open Publication No. 2002-273116 (Patent Document 1). A filter element disclosed in this Patent Document 1 is a filter element that is provided with a pleated filter member and a reinforcing rib made of synthetic resin formed integrally with the filter member. The reinforcing rib is provided so as to extend from one end to the other end of the filter element in a direction perpendicularly intersecting a pleated direction on the center line of the pleated side line of the filter member except a peripheral edge portion of the filter member.

As described above, the filter element disclosed in the Patent Document 1 is formed from a frame body or frame member integrally formed with the peripheral edge portion of the filter member and a reinforcing rib extending from one end to the other end of the filter member in the pleated direction except the peripheral edge portion thereof with the synthetic resin integrally with each other. According to this structure, it becomes possible to prevent close-contact or direct-contact of adjacent gathers of the pleated lines at a fluid-flow time, thereby keeping large effective filtrating area and maintaining the pleated shape and rigidity of the frame body.

The filter element described above is formed from the frame body and the reinforcing rib which are formed integrally with the same synthetic resin, and when the frame body and the reinforcing rib are formed by injection molding process, the filter member is manufactured by insert-molding process.

According to the insert-molding process, since the filter member is disposed in a mold, the mold is clamped, and then, synthetic resin fused in the mold is injected, the filter member and the reinforcing rib can thus be integrally formed. In this method, since the filter member and the reinforcing rib can be simultaneously formed, the number of parts or steps of manufacturing working can be eliminated or decreased, contributing to cost saving.

However, in the case of insert-molding the filter member formed of a filter paper or non-woven fabric, there cases a case such that a synthetic resin fused in the injection-molding process seeps into the filter member through boundary of the frame body or the reinforcing rib by injection pressure, and thereby, the seeped fused synthetic resin protrude as burrs on the surface of the filter member, which constitutes an obstacle for ensuring an effective filtrating area. In order to obviate such defect, there is proposed a countermeasure such that the boundary of the frame body or the reinforcing rib is compressed by using a mold to prevent the fused synthetic resin from seeping from the boundary of the frame body or the reinforcing rib or from protruding on the surface of the filter member.

In the thus formed filter element, a portion of the filter member compressed by the mold is clogged, which results in increasing in resistance against filtration, and hence, reducing the effective filtrating area, thus providing a problem. More particularly, in the filter element in which the reinforcing rib is formed integrally with the filter member, it is necessary to compress both the sides of the reinforcing rib, and accordingly, an area to be compressed increases, which leads enlargement of the filter element in size and results in difficulty for ensuring an effective filtrating area without enlarging the filter element.

SUMMARY OF THE INVENTION

The present invention was conceived in consideration of the circumstances in the prior art mentioned above, and an object thereof is to provide a filter element capable of ensuring an effective filtrating area without increasing a size of the filter element by suppressing reducing of the effective filtrating area by a pressure compressed by a mold even in a case where a reinforcing rib is formed in a frame body.

The above and other objects of the present invention can be achieved by providing a filter element, which includes a filter member provided with a plurality of pleat portions and a frame body holding an outer peripheral portion of the filter member, wherein the frame body is provided with a comb-shaped portion having a comb-tooth portion which is inserted into adjacent pleat portions and contacts to a surface of the filter member, and the comb-shaped member is formed by an insert-molding process.

In the aspect of the filter element mentioned above, the following preferred embodiments may be provided.

It may be preferred that the comb-shaped member is disposed in a clean side of the filter member.

It may be also preferred that a projection is formed to at least one end of the comb-shaped member so as to extend in a longitudinal direction thereof. It may be desired that the projection is firmly embedded into the frame body.

It may be also preferred that the frame body is formed with holding portions which hold outer peripheral edges of both ends of the comb-shaped member in the longitudinal direction thereof.

It may be also preferred that the comb-tooth portion has a tip end formed in circular-arc shape.

Further, it is to be noted that the above embodiment and preferred modes thereof do not provide all the essential features of the present invention, and for example, sub-combination of these modes may constitute the invention.

According to the filter element of the present invention of the structures and characters mentioned above, since the comb-shaped member, which has comb-tooth portions each of which is inserted into adjacent pleat portions of the filter member and contacts the surface of the filter member, is formed by means of the insert-molding process, the comb-shaped member formed separately from the frame body can be insert-molded together, and after the insert-molding, the comb-shaped member functions as like as reinforcing rib, and accordingly, without compressing the surface of the filter member by the mold, the filter element having a reinforcing rib can be formed, so that the reduction of the effective filtrating area due to the mold compression can be suppressed and the effective filtrating area can be ensured without making large the filter element.

Furthermore, in the filter element according to the present invention, since the comb-shaped member is arranged on the clean side of the filter member, the comb-shaped member and the filter member can be prevented from being separated from each other by the filtration of fluid.

Still furthermore, in the filter element according to the present invention, since the projection is formed to at least one end of the comb-shaped member so as to extend in the longitudinal direction thereof, the comb-shaped member can be integrally fixed to the frame body by such projection. In addition, since the projection is firmly embedded into the frame body, the comb-shaped member can be integrally fixed to the frame body, and even if an external force is applied, the filter element cannot be easily damaged and can be firmly reinforced.

Still furthermore, in the filter element according to the present invention, since the frame body is formed with holding portions which hold the outer peripheral edges of both ends of the comb-shaped member in the longitudinal direction thereof, the comb-shaped member can be prevented from falling off from the frame body, and the comb-shaped member and the frame body can be surely integrated.

In addition, in the filter element of the present invention, since the tip end of the comb-tooth portion is formed so as to proved circular-arc shape, the filter ember can be prevented from being damaged by the tip end when inserted and also prevent the adjacent pleat portions from being stuck to each other to thereby prevent increase in the ventilation resistance.

The nature and further characteristic features of the present invention will be made clearer from the following description made with reference to the accompanying drawings.

DESCRIPTION OF THE PREFERRED EMBODIMENT

Hereunder, a preferred one embodiment of the present invention will be described with reference to the accompanying drawings.

It is to be noted that the following embodiment is not limited to the invention defined by appended claims, and all the combination of the subject features of the present embodiment described herein is not essential for the solution of the present invention.

Figure 1:
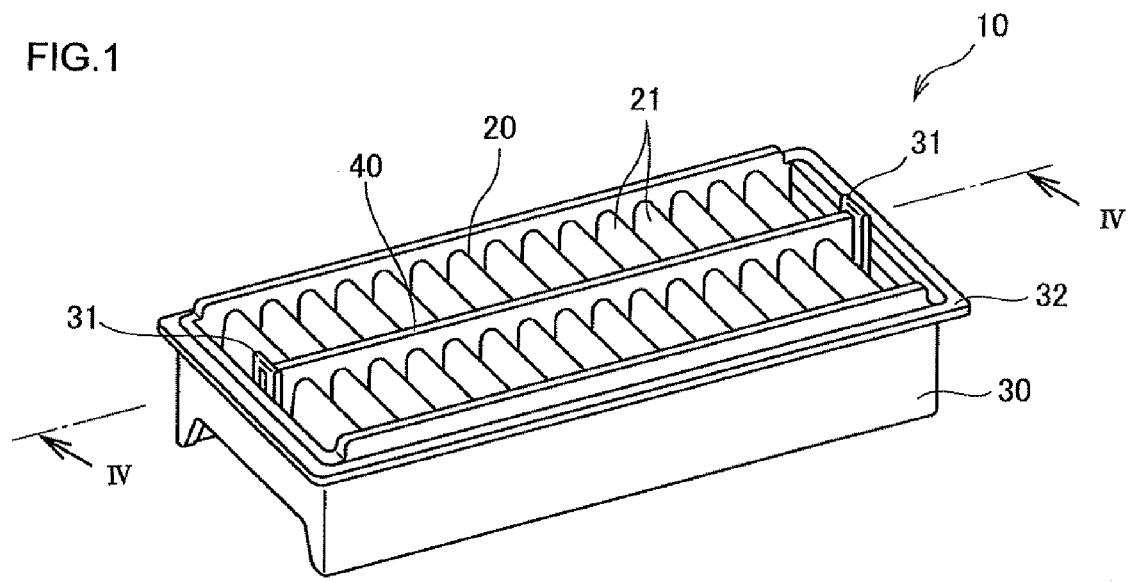
FIG. 1 is a perspective view showing a clean side of a filter element according to an embodiment of the present invention.

With reference to FIG. 1 showing a filter element according to one embodiment of the present invention as viewed from a clean side thereof, the filter element 10 is provided with filter member 20 and a frame body 30 having outer peripheral edge portions extending in longitudinal and width directions in a manner such that the frame body supports the outer peripheral edge portions of the filter member 20.

The filter member 20 is formed of a sheet-shaped filter paper or a non-woven fabric which is pleated in a fashion such that predetermined mount portions and valley portions of the pleated structure are alternately arranged along the width direction of the filter paper or non-woven fabric. The frame body 30 has a clean side formed with a flanged portion 32 projecting outward along the outer peripheral edge portion by which the filter element 10 is settled in position when it is mounted to an objective member or parts.

Figure 2:
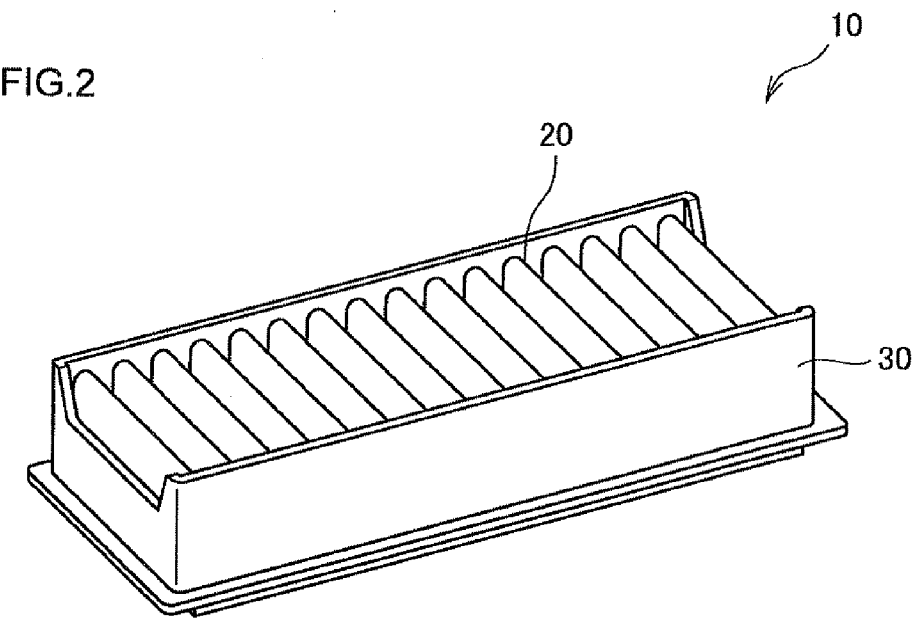
FIG. 2 is a perspective view showing a dust side of the filter element according to the embodiment of FIG. 1.
Figure 4:
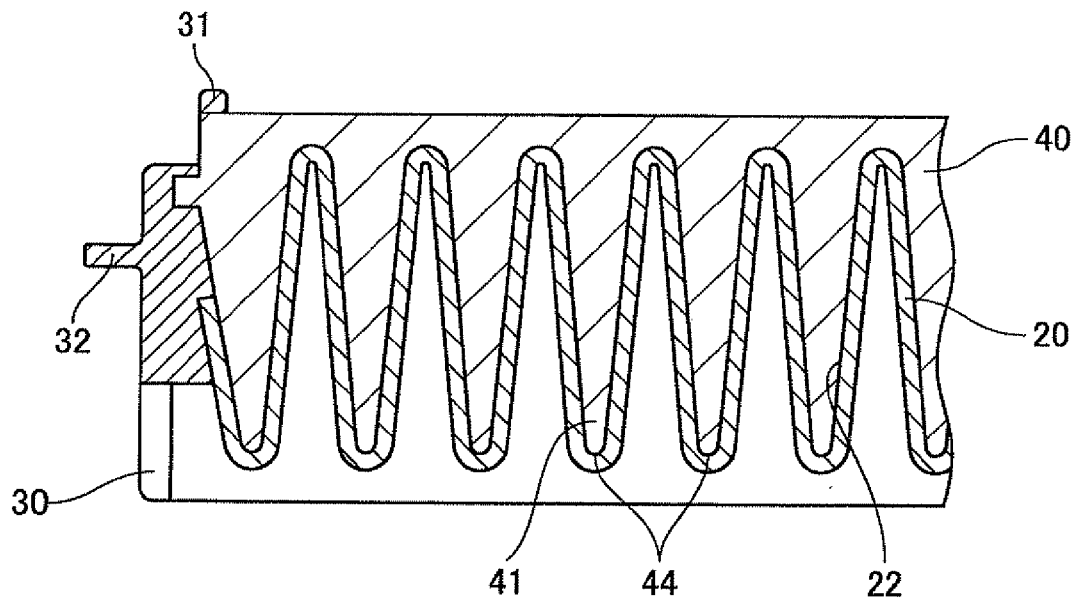
FIG. 4 is a sectional view taken along the line IV-IV in FIG. 1.

As shown in FIG. 4, a comb-shaped member 40, described hereinafter, is mounted to the clean side of the filter member 20 along the longitudinal direction of the frame body 30 so as to abut against the surface 22 of the filter member 20. The comb-shaped member 40 is arranged only on the clean side and not arranged on a dust side of the filter element 10 as shown in FIG. 2.

The filter element 10 according to the present embodiment filtrate a fluid during the flow of the fluid from the dust side to the clean side of the filter element 10, and accordingly, by arranging the comb-shaped member 40 on the clean side, a force is applied in the direction in which the filter ember 20 and the comb-shaped member 40 tightly contact to each other by the filtration of the fluid. Thus, by abutting the comb-shaped member 40 against the surface 22 of the filter member 20, the separation between the filter member 20 and the comb-shaped member 40 can be effectively prevented.

Figure 3:
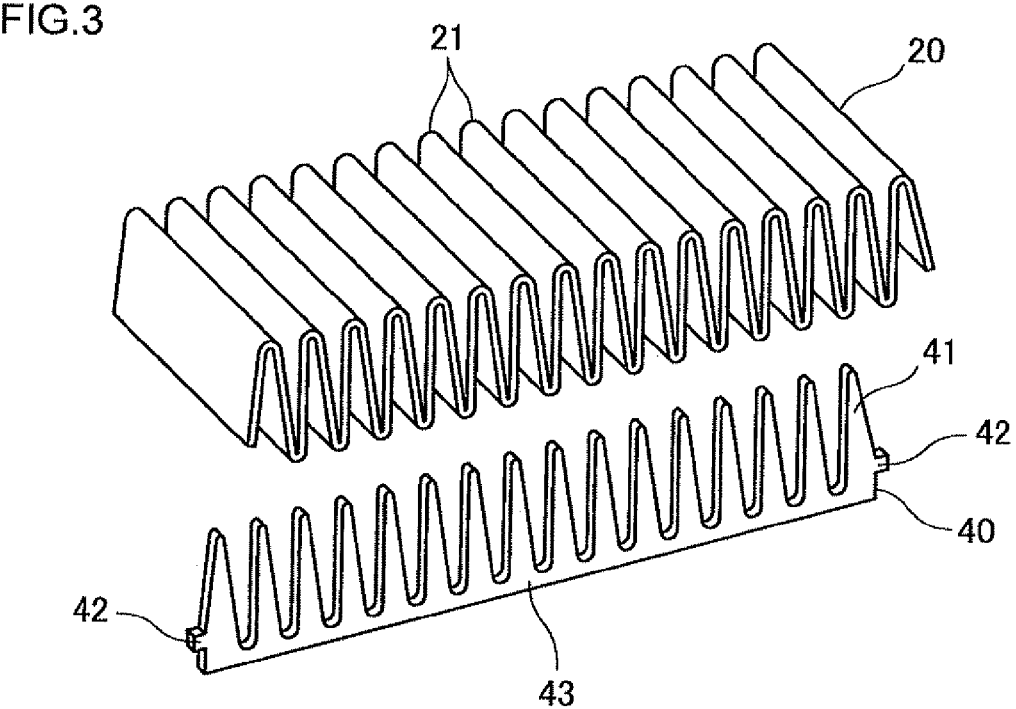
FIG. 3 is a perspective view showing a filter member and a comb-shaped member which constitute the filter element when engaged by insertion.

As shown in FIGS. 3 and 4, the comb-shaped member 40 is provided with a comb-tooth portion having teeth 41 and a comb-tooth body 43. The teeth 41 of the comb-tooth portion are arranged in correspondence to pleats 21 of a pleated portion of the filter member 20 in a manner such that each tooth 41 can be inserted into a portion between the adjacent pleats 21. The comb-tooth portion 41 and the comb-tooth body 43 are integrally formed as comb-shaped member 40 which is also provided with projections 42 projecting outward in the longitudinal direction from both ends of the comb-shaped member 40.

Further, the tip end 44 of each of the teeth 41 is formed so as to provide a circular-arc shape to thereby prevent the adjacent pleats 21, 21 from being stick to each other at the time of passing the fluid, as well as from damaging the surface 22 of the filter member 20 when being inserted. Further, such circular-arc shape has a predetermined curvature so as to prevent the sticking of the adjacent pleats 21, which will be optionally set in accordance with a size of the filter member 20 or an interval between the adjacent pleats 21, 21.

Furthermore, as shown in FIGS. 1 and 4, holding portions 31 are formed to both the ends of the comb-shaped member 40 at which the holding portions 31 continuously contact so as to surround the outer peripheral edges of the ends of the comb-shaped member 40 and to firmly embed the projections 42 into the frame body 30, thereby firmly holding the comb-shaped member 40 not to be movable in all the directions including longitudinal, width and vertical directions, thus the comb-shaped member 40 and the frame body 30 being assembled integrally.

Hereunder, a method of manufacturing the filter element 10 of the structure according to the present embodiment mentioned above will be described.

The filter element 10 of the present embodiment is manufactured by performing the insert-molding process to the filter member 20 and the comb-shaped member 40 at the time of forming the frame body 30 through the injection molding process.

In other words, the manufacturing method of the present embodiment in which the filter member 20 and the comb-shaped member 40 are formed through the insert-molding process, as mentioned above, differs from a conventional insert-molding method in which a filter element is composed of a reinforcing member and a frame body which are integrally formed.

According to the structure and the manufacture of the filter element of the present embodiment, the synthetic resin fused in the filter member 20 does not seep from the boundary between the filter member 20 and the comb-shaped member 40, or does not project as burr on the surface of the filter member 20, by the injection pressure without compressing, in the mold, both the side portions of the comb-shaped member 40 at the time of insert-molding process, and therefore, it becomes possible to ensure the effective filtrating area without enlarging the size of the filter member 20.

In addition, since each of the comb-tooth portions 41 is inserted into the adjacent two pleats 21, the comb-tooth portions 41 attain the same function as that attained by the conventional reinforcing rib to thereby prevent the sticking of the adjacent pleats 21 to each other, thus improving the filtrating performance and reducing resistance against fluid flow.

Further, although, in the present embodiment, the frame body 30 and the comb-shaped member 40 are formed of synthetic resin, they may be formed of thermoplastic synthetic resin such as polypropylene series resin or polyamide series resin, for example.

Furthermore, in the forgoing description, although the comb-shaped member 40 of the filter element of the present embodiment is arranged so as to abut against the surface 22 of the filter member 20, the comb-shaped member 40 may be bonded to the surface 22 of the filter member 20 by a bonding agent or like.

Still furthermore, in the forgoing description concerning the filter element of the present invention, although the one comb-shaped member 40 is inserted, the number of the comb-shaped member 40 to be used is not limited to the described one, and two or more than two comb-shaped members 40 may be used for manufacturing a wide-shaped filter element, large-sized filter element and so on.

As described above, it is further to be noted that the present invention is not limited to the described embodiment and many other changes and modifications or alternations may be made without departing from the spirit and scope of the appended claims.

What is claimed is:

1. A filter element comprising:
a filter member provided with a plurality of pleat portions; and
a frame body holding an outer peripheral portion of the filter member,
wherein the frame body is provided with a comb-shaped member having a comb-tooth portion which is inserted into adjacent pleat portions and contacts to a surface of the filter member, and the comb-shaped member is formed by an insert-molding process,
wherein a projection is formed to at least one end of the comb-shaped member so as to extend in a longitudinal direction thereof, and
wherein the projection is firmly embedded into the frame body, and
wherein holding portions are formed to both the ends of the comb-shaped member at which the holding portions continuously contact so as to surround the outer peripheral edges of the ends of the comb-shaped member.

2. The filter element according to claim 1, wherein the comb-shaped member is disposed in a clean side of the filter member.

3. The filter element according to claim 1, wherein the frame body is formed with holding portions which hold outer peripheral edges of both ends of the comb-shaped member in the longitudinal direction thereof.

4. The filter element according to claim 1, wherein the comb-tooth portion has a tip end formed in circular-arc shape.

* * * * *